Figure 1:
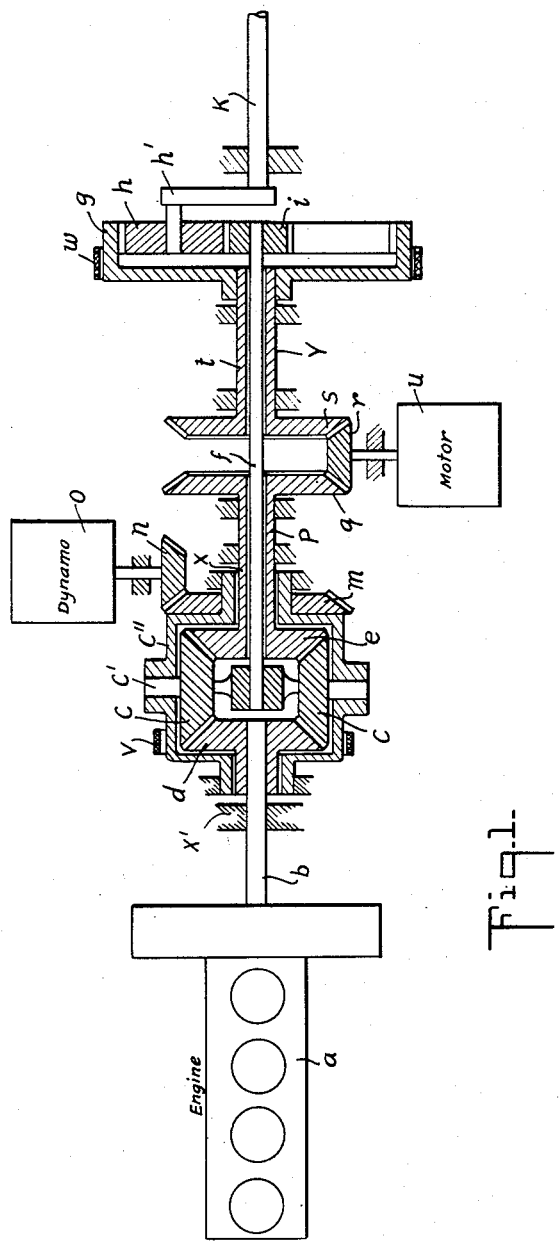

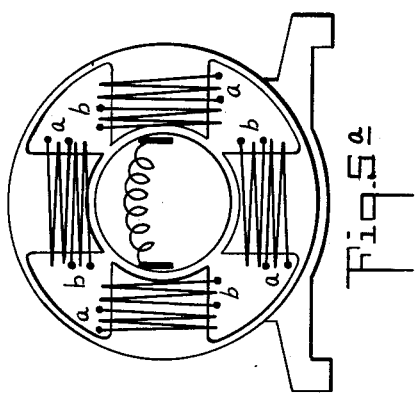
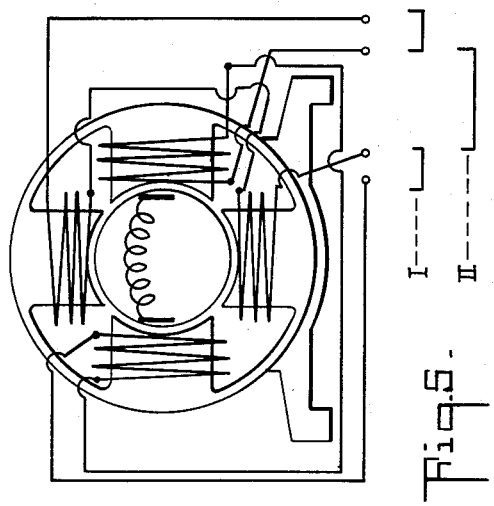

Patented Aug. 1, 1944

2,355,000

UNITED STATES PATENT OFFICE 2,355,000

POWER AND MOTION TRANSMISSION SYSTEM

Heinrich Fritz Liebrecht, London, England

Application February 10, 1941, Serial No. 378,241
In Great Britain February 10, 1940

4 Claims. (Cl. 74—282)

This invention relates to a power and motion transmission system, particularly for internal combustion engine driven road or rail vehicles comprising an infinitely variable transmission gear, of the type described and claimed in my U. S. patent application Serial No. 333,999 of May 8, 1940, which allows of gradually varying the ratio between the driving engine shaft (the prime mover) and the shaft transmitting power to the driven vehicle wheels (the outgoing motion). In the transmission gear disclosed in the copending application this variation is effected by branching off part of the transmitted energy from the gear and reuniting it at a controlled speed and torque with that part of the energy which passes straight through the gear. The by-passed energy thus serves as a control for the ratio at which the total energy is transmitted by the gear.

The gear consists of two epicyclic gears arranged in series between the prime mover and the outgoing motion, and the invention is based on the discovery that the tangential forces acting on the centre wheel and on the outside wheel must be equal and unidirected while the tangential force acting on the stub shaft of the intermediate wheels of the planet wheel carrier is equal to the sum of these forces i. e. of the double value of either of them and directed in the opposite direction, in order to establish equilibrium.

According to the present invention the branched off part of the energy is by-passed from one part of the epicyclic gears to another part of the epicyclic gears so as to establish equilibrium of tangential forces in both epicyclic gears at each ratio of power transmission by withdrawing force from that part of the second epicyclic gear which through direct connection with the first epicyclic gear would receive an excess of force, and shunting it over to that part of the second epicyclic gear which through the usual components of said gear would receive too low a force. The amount of by-passed force varies with varying ratio of transmission which is thus controlled by determining said force.

More particularly, in a preferred form of my invention the center wheel of the first epicyclic gear is connected with the prime mover, while its planet wheel carrier is connected, on the one hand, with the centre wheel of the second epicyclic gear, and, on the other hand, with the energy by-passing means, and the outside wheels of the two epicyclic gears are connected with one another and with said energy by-passing means.

Preferably the first epicyclic gear is a bevel gear. Those of its bevel pinions which correspond to the centre wheel and the outside wheel, respectively, are of equal diameter which results in the "outside wheel" rotating (with the planet wheel carrier supposed to be at a stand-still) at the same number of revolutions in the opposite direction of the "centre wheel." Therefore a reversing gear is to be arranged between the "outside wheel" of the first epicyclic gear and that of the second one which is preferably an ordinary spur gear having an internally toothed outside wheel of larger diameter than the centre wheel the diameter ratio of these two wheels being determined according to the requirements of the individual case.

It is an object of my invention to keep the overall efficiency of the new gear well within the range of efficiency attained with ordinary stepped gears even when the efficiency of transmission of the by-passed part of energy is lower through losses incurred in its transformation which is attained by keeping said by-passed energy small as compared with the straight through energy. If instead of comparing the gears by themselves the whole units consisting of internal combustion engine and gear are compared the overall efficiency of the unit comprising the new gear is superior since its gradual change of transmission ratio allows of operating the engine always near its optimum efficiency point.

It is a further object of my invention to provide a power unit which has rather less than more components as compared with on ordinary unit consisting of internal combustion engine, clutch, gear, starter battery with electromotor and loading dynamo, and which accordingly is not costlier while giving higher efficiency.

It is another object of my invention to provide a gear which allows of continuing the operation of the vehicle at a reduced number of speeds without the use of the energy by-passing means, and which gives full safety when the vehicle runs by inertia or by gravity, and the engine acts, by its compression, as a brake.

With these and other objects in view I have designed my power motion transmission system with a controllable electric energy by-passing means consisting mainly of a dynamo driven by, and thus branching-off, energy from, the first epicyclic gear or its connection with the second epicyclic gear, of an electromotor supplied by said dynamo and transmitting energy to the second epicyclic gear, and of an electrical control means influencing the by-passed energy and the tangential force electrically transmitted to said second epicyclic gear by said electromotor.

Preferably a direct current system is used which allows the use of the dynamo for loading the accumulator battery of the vehicle, and thus to dispense with a separate loading dynamo. Likewise the electromotor of the gear according to the invention can be so connected to the battery of the vehicle as to start the engine thus dispensing with a separate starter electromotor. In this way the expenses incurred, on the one hand, for the electric equipment of the gear can be saved, on the other hand, on the electric equipment of the engine. In a preferred form both the electromotor and the dynamo are to be connected with the accumulator battery so as to act simultaneously as starter motors thus halving the load for each of them.

Preferably both the electromotor and the dynamo are of the series type, with an additional separately excited coil on the field electromagnets of the dynamo which causes an induction opposed to that of the coils in series with the armature. The accumulator battery of the vehicle will be a suitable supply for the separately excited coils.

This preferred embodiment has the advantage that the characteristics of the dynamo and of the motor match almost perfectly, and that with increasing torque at the outgoing motion the ratio of transmission is automatically increased so as to keep the product of torque and speed (which is the power required) constant. The driver can influence the ratio of transmission by controlling the independently excited coil. This coil is energised so as to weaken the induction caused by the coil in series with the armature. Consequently by increasing the induction of the separately excited coil the resulting field is weakened and consequently the dynamo, being braked to a lesser extent, will run at higher speed owing to the mechanical conditions. This means increasing the ratio of transmission as will be seen more clearly from the special description of the preferred embodiment.

Of course the driver can increase and diminish the speed and power of the engine in the usual way, or a centrifugal governor may stabilize the function of the engine.

Figure 2:
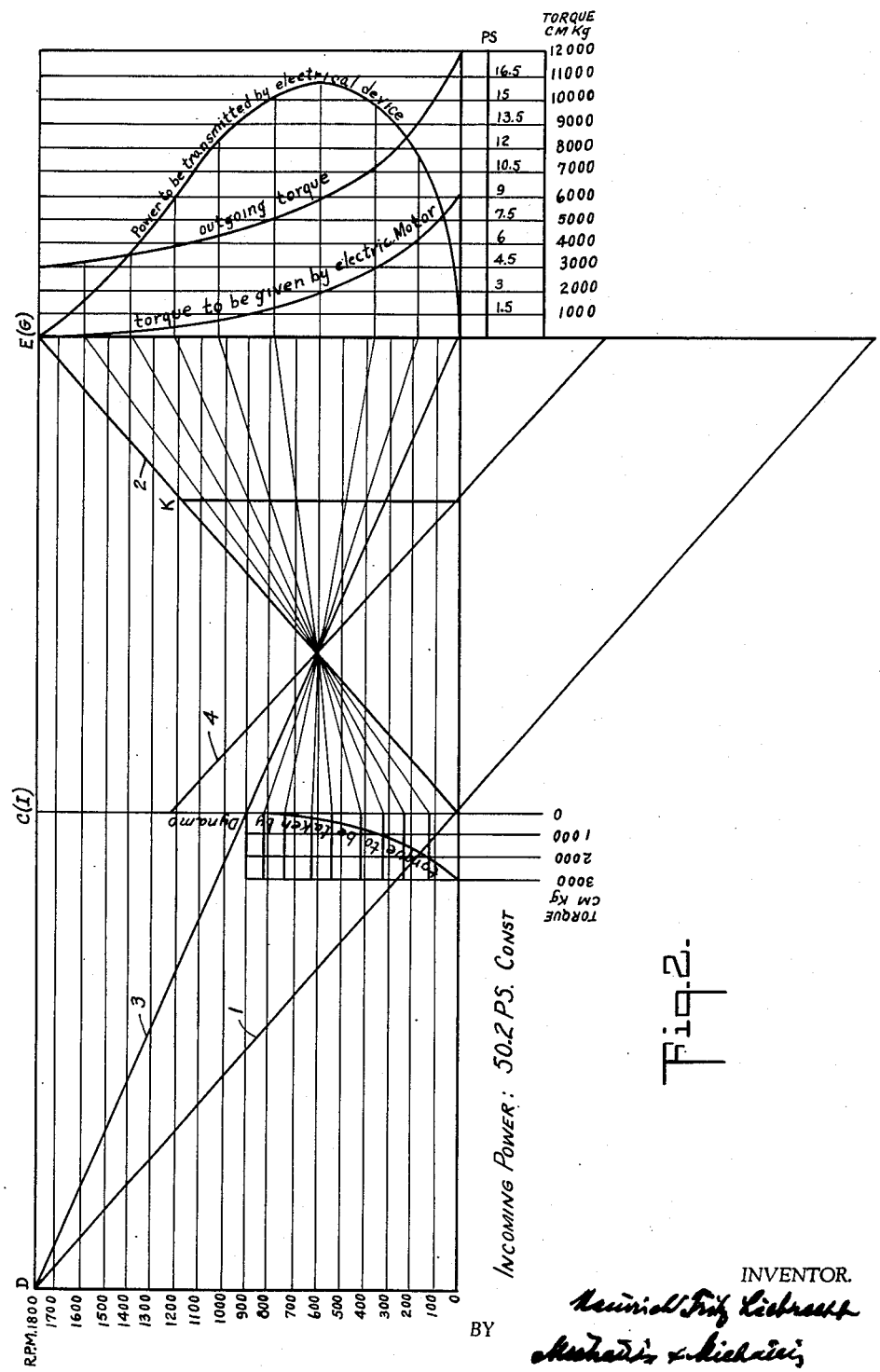
Figure 3:
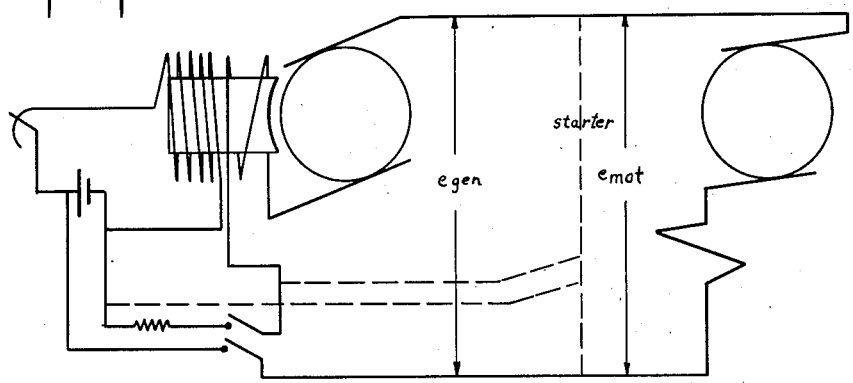
Figure 4:
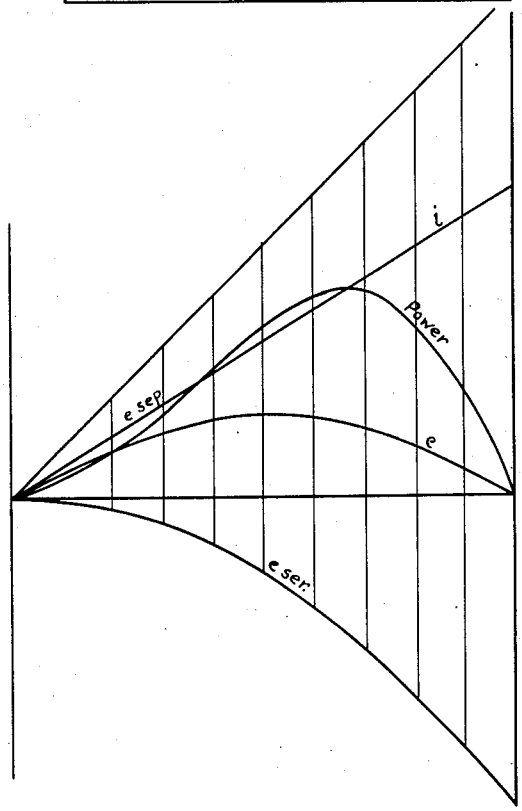

Further details and developments of the invention will be understood from the following special description with reference to the drawings which form part of this specification and illustrate diagrammatically one embodiment of my invention by way of example. In the drawings:

Fig. 1 is a longitudinal section (in plan view) of a preferred form of the invention, and Fig. 2 is a diagram of the transmission ratio, power, tangential force, and torque in various working conditions. Fig. 3 is a wiring diagram of the preferred embodiment of the electric equipment, and Fig. 4 is a diagram of the current voltage and power produced by the dynamo, and consumed by the electromotor, at various speeds; Figs. 5 and 5a show another embodiment of the electric equipment in front elevation and diagram, respectively.

Referring now to Fig. 1 of the drawings $a$ is the prime mover, for example an internal combustion engine, $b$ is the prime mover shaft which, without requiring an intermediate clutch, is connected with the pinion $d$ acting as "centre wheel" of the first planet gear, the intermediate or planet wheels $c$ of which are pivoted on the planet wheel carrier $c'$ within the rotatably mounted gear box $c''$. The planet wheels $c$ mesh, on the one hand, with the "centre wheel" $d$, and, on the other hand, with the "outside wheel" $e$ which is of the same diameter as the "centre wheel" $d$. The planet wheel carrier $c'$ is connected with the shaft $f$ which carries on its other end the centre wheel $i$ of the second epicyclic gear to which it transmits the greater part of the total energy passing the gear. The outside wheel of the second epicyclic gear is denoted $g$, and its planet wheel $h$ meshes with the centre wheel $i$ and said outside wheel $g$, and is pivoted on the planet wheel carrier $h'$ which is connected with the outgoing motion shaft $k$.

A bevel wheel $m$ is connected with the first epicyclic gear's box $c''$ and meshes with a bevel pinion $n$ driving the dynamo $o$.

The "outside wheel" $e$ of the first epicyclic gear is connected through a hollow shaft $p$ to the bevel wheel $q$ which meshes with the bevel pinion $r$ which may be connected with the electromotor $u$, and meshes with the bevel wheel $s$ which, in turn, is connected through the hollow shaft $t$ with the outside wheel $g$ of the second epicyclic gear. The bevel wheels $q$ and $s$ and bevel pinion $r$ form an inversion gear between the two outside wheels $e$ and $g$. Obviously the electromotor could be arranged so as to engage any other part of the system constituted by the said two outside wheels and their intermediate elements, but it has been found most advantageous to connect it with the quickly rotating pinion $r$.

A progressively acting brake, for example a friction brake of the band type, $v$ may be arranged so as to stop the gear box $c''$ of the first epicyclic gear when tightened. Similarly a band friction brake $w$ may be arranged so as to stop the outside wheel $g$ of the second epicyclic gear.

The operation of this gear is the following (compare diagram Fig. 2): when the vehicle is at a stand-still with its engine $a$ running (say at a speed of 1800 R. P. M.) the prime mover shaft $b$ and the "centre wheel" $d$ rotate at the same speed. The tangential force available at the mean pitch diameter of the "centre wheel" $d$ is determined by the characteristic (not shown) of the engine i. e. from its torque at the given speed of rotation. Supposing now the brake $v$ were tightened (which is not the case in ordinary function of the gear) the planet wheels $c$ would transmit that speed and tangential force to the "outside wheel" $e$ which would rotate in the opposite sense to the "centre wheel" and, through the inversion gear $q$, $r$, $s$, would drive the outside wheel $g$ in the same direction and at the same speed as the prime mover. Supposing the pitch diameter of the second outside wheel $g$ be twice that of the bevel wheel $e$ the tangential force there would half of that at the mean pitch diameter of bevel wheel $e$. Now, with the centre wheel $i$ being stopped by the brake $v$ as described above, the planet wheel $h$ rolls around it in the same sense as the outside wheel $g$. The tangential force acting on the stub of the planet wheel carrier $h'$ is twice the tangential force acting in the pitch diameter. From the diameter of the circle on which the centre of the planet wheel lies and from that tangential force results the torque on the outgoing motion $k$.

In diagram Fig. 2 on the vertical line D the speed of the "centre wheel" $d$ of the first epicyclic gear is shown, on the vertical line C that of the first planet wheel carrier $c$ (which is also that of the second centre wheel $i$), and on line E that of the "outside wheel" $e$ of the first epicyclic gear. As the bevel wheels $d$ and $e$ are of equal diameter the distance of lines D and E from line C are also equal. Accordingly the straight line 1 from the point on D indicating the speed of the prime mover through zero on line C (because of the supposed stopping of the first planet wheel carrier) intersects the line E at a point indicating the negative equal value of the value on line D as the speed of the first "outside wheel" $e$. Because of the inversion gear $q$, $r$, $s$ the second outside wheel $g$ rotates in the same sense as the prime mover, and therefore the negative value on line E is put on the positive side of G.

By dividing the interval between line G (which coincides with line E) and line I (which coincides with line C) in the ratio of the diameters of the centre wheel $i$ and the outside wheel $g$ of the second epicyclic gear the line K can be drawn. The point of intersection of line 2 connecting the speed value of the outside wheel $g$ with the zero point of the standing-still second centre wheel $i$ with line K gives the speed of the second planet wheel carrier $h'$ under the working conditions contemplated.

Now supposing the brake $v$ were eased, and brake $w$ were tightened so as to stop the second outside wheel $g$, the line 3 drawn from the speed of the first "centre wheel" $d$ on line D to zero speed on line G would indicate on its point of intersection with line C the forward speed of the first planet wheel carrier $c$ as being half that of the prime mover. The second centre wheel $i$ being connected with the first planet wheel carrier $c$ and the speed lines I and C coinciding, accordingly the straight line drawn from the speed point on I to zero speed on G (which coincides with line 3) intersects line K at a point indicating the speed of the outgoing motion $k$ under the conditions contemplated now. It will be seen that this speed is much lower than that obtained by tightening brake $v$. We obtain therefore two different speeds without the use of the electric equipment, the lower one of which is particularly useful as a safety device for braking the vehicle through the compression of the engine on steep descents.

However these two speeds which have been described first in order to facilitate understanding the diagram of Fig. 2 do not correspond to normal working conditions which are as follows: the engine is running at a speed indicated on line D, and the vehicle is first at a stand-still. With the brakes $v$ and $w$ loosened, both epicyclic gears are revolving in order to make up for the difference, and the speed of the various parts can be found as follows: as the diameters of the gears are of given value the functional relations of their speeds are linear, and therefore all the straight lines indicating the speed relations of the second epicyclic gear must pass the point of intersection of the lines 2 and 3 described in the foregoing paragraphs. As the outgoing shaft $k$ is now supposed to be at a stand-still zero point of line K must be connected with said point of intersection by a line 4 which intersects line G on the negative side. This means that the second outside wheel $g$ now rotates in the inverse direction at a speed which is (under the assumed diameter relations) one third of its maximum forward speed. On the other hand line 4 intersects line I at a point higher up than line 3 indicating the speed of the second centre wheel $i$ (which is equal to that of the first planet wheel carrier box $c''$) to be high.

Now outside wheel $g$ of the second epicyclic gear is coupled through the bevel wheel $s$ and bevel pinion $r$ with the electromotor $u$, and the first epicyclic gear box $c''$ is coupled through bevel wheel $m$ and bevel pinion $n$ with the dynamo $o$. With the engine running idle and the vehicle being at a stand-still the electric connection between motor $u$ and dynamo $o$ is interrupted.

If now the driver electrically connects the dynamo $o$ with the motor $u$ which by being driven mechanically in inverse direction accordingly acts as a current source itself, the two electric machines produce opposed currents whereby the rotation of both of them is slowed down. Speaking in terms of the diagram of Fig. 2 this means that the straight line 4 turns round the common intersecting point in an anticlockwise sense so that its point of intersection with line K advances from zero to the positive side which means forward rotation of the outgoing shaft $k$ and, accordingly, starting the forward motion of the vehicle.

As soon as line 4 has turned so far as to coincide with line 3 the starting period of the vehicle has passed into that of normal forward motion. The electromotor has come now to a stand-still (indicated by zero point on line G), and the dynamo runs at its highest normal speed indicated by the intersection point of lines 3 and C. From now on the electric force produced by the dynamo forces the electromotor to run in its normal direction, thus driving the second outside wheel $g$ at ever increasing speed until the working condition of line 2 is attained when maximum speed of the outgoing shaft $k$ (confer intersection point of lines $s$ and K) is attained, and the dynamo has come to a stand-still (which is indicated by zero point on line C).

If the torque to be overcome by the outgoing motion $k$ increases, for example if the vehicle begins to run uphill, the load on the electromotor increases and its speed is slowed down. Speaking again in terms of the diagram of Fig. 2, the straight line 2 turns around the common point of intersection in a clockwise direction thus approaching the line 3 whereby the point of intersection with line K is lowered, which means slowing down the speed of the vehicle and increasing the ratio of transmission between the engine and the driven wheels of the vehicle.

Of course the driver of the vehicle could at the same time open the throttle and make the engine run faster and with higher power. This would mean increasing the scale of diagram 2 in the direction of its ordinate, and equilibrium between the power of the engine and the power consumed by the vehicle would be reached at a lower ratio of transmission the value of which can be found in the manner described above.

It will now be useful to consider the equilibrium of tangential forces in the second epicyclic gear, for example first under the condition marked by line 3, i. e. with the second outside wheel $g$ standing still and with the second centre wheel $i$ running at half the speed of the prime mover. Assuming the pitch diameter of said centre wheel $i$ to be half the mean pitch diameter of the bevel wheels $d$ or $e$ of the first epicyclic gear, and the pitch diameter of the second outside wheel $g$ to be equal to that diameter (i. e. twice the diameter of the second centre wheel $i$) the tangential forces are as follows:

The tangential force acting on the first planet wheel carrier $c'$ on the mean pitch diameter of the bevel wheels $d$ and $e$ is twice the tangential force of either of them. Accordingly the tangential force acting in the pitch diameter of the second centre wheel $i$ is four times that force. On the other hand, the tangential force acting in the pitch diameter of the second outside wheel $g$ (which is derived from the bevel wheel $e$ through the inversion gear $q, r, s,$) is equal to that force. In order to establish equilibrium in the second epicyclic gear the tangential force of the centre wheel $i$ is to be weakened, and that of the outside wheel $g$ is to be increased, so as to make them both equal to each other. This is done by withdrawing energy from the mechanical unit consisting of the centre wheel $i$, shaft $j$, planet wheel carrier $c'$ and box $c''$ and bevel drive $m, n$ through the dynamo $o$, and passing it on to the mechanical unit consisting of the second outside wheel $g$, the hollow shaft $t$ and bevel drive $r, s$, through the electromotor $u$, thus forming the electrical energy by-pass mentioned on the beginning of this specification.

I wish it to be understood that I do not desire to be limited to the details described in the foregoing specification or illustrated in the drawings, for obvious modifications will occur to a person skilled in the art.

What I claim is:

1. An infinitely variable transmission gear comprising a first epicyclic gear consisting of a centre wheel connected with the prime mover, an outside wheel, planet wheels meshing both with said centre wheel and said outside wheel, a planet wheel carrier, a dynamo connected with said planet wheel carrier, a second epicyclic gear consisting of a centre wheel connected with the planet wheel carrier of the first epicyclic gear, an outside wheel connected with the outside wheel of the first epicyclic gear through an inversion gear, planet wheels meshing both with said centre wheel and said outside wheel, a planet wheel carrier connected with the outgoing motion, an electromotor connected with the outside wheel of the second epicyclic gear, and electric connection between said dynamo and said electromotor.

2. An infinitely variable transmission gear comprising a first epicyclic gear of the bevel gear type consisting of a bevelled wheel connected with the prime mover, bevelled planet wheels, a bevelled wheel meshing with said planet wheels, a planet wheel carrier, and gear box connected with said planet wheel carrier, a dynamo, means for transmitting motion from said gear box to said dynamo, an inversion gear connected with said planet wheel driven bevelled wheel, a second epicyclic gear of the spur wheel type consisting of a centre wheel connected with the planet wheel carrier of the first epicyclic gear, an internally toothed outside wheel connected through the said inversion gear with the planet wheel driven bevelled wheel of the first epicyclic gear, planet wheels meshing both with said centre wheel and said outside wheel, a planet wheel carrier connected with the outgoing motion, an electromotor connected with said inversion gear, and electrical connection between said dynamo and said electromotor.

3. Power and motion transmission system comprising in combination, a driving shaft and a driven shaft, a prime mover arranged for driving said driving shaft, a separate epicyclic gear operatively associated with each shaft, one of said gears comprising a centre wheel fixed on said driving shaft, an outside wheel, a planet wheel carrier and planet wheels on said carrier meshing with said centre and outside wheels, the other gear comprising a centre wheel coupled with the planet wheel carrier of said first gear, an outside wheel, a planet wheel carrier, planet wheels on said carrier meshing with said center and outside wheels, an inversion gear coupling the outside wheels of said two gears, the planet wheel carrier of said other epicyclic gear being fixed on said driven shaft, a dynamo coupled with the planet wheel carrier of said first epicyclic gear, an electromotor coupled with the outside wheel of said other epicyclic gear and an electrical connection between said dynamo and said motor.

4. An electro-mechanical infinitely variable speed gear comprising a first epicyclic gear having a power input member and two power output members, a second epicyclic gear having a power output member and two power input members mechanically coupled respectively to the two power output members of said first mentioned epicyclic gear and arranged so that the forces transmitted from the output members of said first mentioned epicyclic gear to the input members of said second epicyclic gear are unbalanced, and electrical means for transmitting power from one of the power output members of said first epicyclic gear to one of the power input members of said second epicyclic gears to restore the balance.

HEINRICH FRITZ LIEBRECHT.